Figure 1:
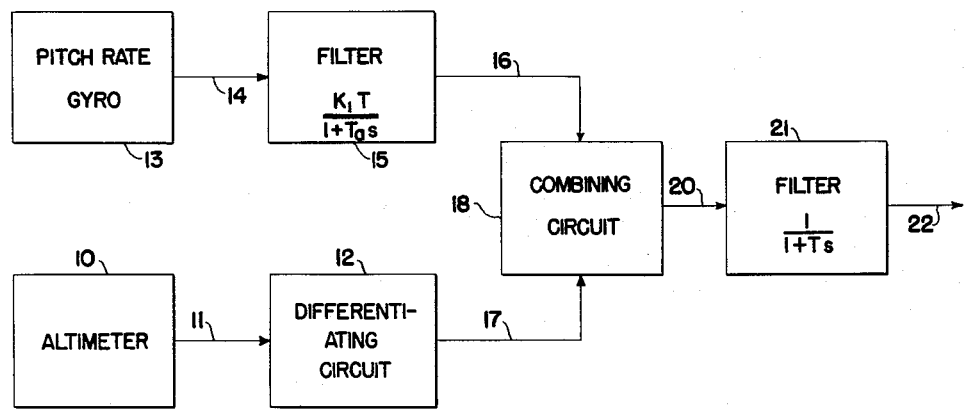

Sept. 25, 1962  R. C. McLANE  3,055,214
AIRCRAFT INSTRUMENTS
Filed April 12, 1956

INVENTOR.
ROBERT C. McLANE
BY
ATTORNEY

United States Patent Office 3,055,214
Patented Sept. 25, 1962

3,055,214
AIRCRAFT INSTRUMENTS
Robert C. McLane, St. Paul, Minn., assignor to Minneapolis-Honeywell Regulator Company, Minneapolis, Minn., a corporation of Delaware
Filed Apr. 12, 1956, Ser. No. 577,877
8 Claims. (Cl. 73—178)

This invention relates to the field of aviation instruments and more particularly to aircraft altitude rate apparatus.

One obvious method of obtaining altitude rate is to differentiate an altitude signal. The use of a radar altitude signal when differentiated provides a good signal of aircraft altitude rate when the altitude of the aircraft is not changing rapidly. However, the radar altitude signal is accompanied by a considerable amount of spurious signal energy, or noise, at frequencies which are high compared with the rate of discent of an aircraft. The effect of differentiating is to greatly accentuate the noise components, to a point where they may entirely mask small signal components.

Filtering adequate to reduce the noise components to a tolerable level attenuates the upper frequency range of the signal components. This means that altitude measuring systems which employ low-pass filtered differentiation of the altitude signal lack the ability to detect high frequency ranges of rate of descent. However, if the low frequency range of altitude rate of such systems is supplemented in proper proportions with a signal representative of the high frequency component of the altitude rate, a true indication of the altitude rate of the aircraft results.

One method to provide this deficiency in the frequency range is to use a device which gives a signal representative of pitch rate. The combination can provide a single signal which contains both high and low frequency components of the rate of change of altitude for a given aircraft.

Systems are presently being employed which use several sources for a single parameter, with filters used to select the most desirable source for a given frequency range of the signal band. However, the present invention uses two different parameters in a novel combination to circumvent the problem of high noise level on a radar type altimeter output signal. To be more specific, the novelty of the system comprises combining the filtered output signals of a pitch rate gyroscope and a differentiated altimeter signal to give one signal indicative of altitude rate of change.

It is a general object of the present invention to provide improved means for giving a signal representative of a rate of motion of a body with respect to a surface.

Another object of the present invention is to provide a noise free aircraft altitude rate signal from airborne apparatus.

A further object of the invention is to provide a device responsive to high frequency components of the altitude rate while at the same time limiting the high frequency noise level.

Another object of this invention is to provide an instrument to give an accurate indication of the rate of descent.

Still another object of the invention is to provide a smooth rate signal which is the combintaion of two separately arrived at signals.

Figure 2:
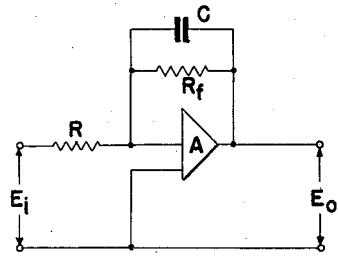

These and other features of the invention will be understood more clearly and fully from the following detailed description and accompanying drawing in which:

FIGURE 1 is a schematic diagram exhibiting in generalized form the elements used to provide an altitude rate signal, and FIGURE 2 is a circuit diagram showing a typical filter design that may be employed in the filter circuits of FIGURE 1.

Referring to FIGURE 1, an apparatus to provide aircraft altitude rate or rate of descent is shown comprising a radar altimeter 10, producing a signal representative of the altitude $h$ of the aircraft. Alternatively altimeter 10 may comprise pressure detecting means producing a signal proportional to the ambient air pressure. This signal is supplied to a differentiating circuit 12 through connecting means 11. Radar altimeter 10 may be any one of many types currently installed in military or commercial aircraft. The differentiating circuit 12 has an altitude rate output signal that energizes a combining circuit 18 through connecting means 17. A pitch rate gyroscope 13 is employed to produce a pitch rate signal and may be any conventional type. Pitch rate gyroscope 13 energizes a filter 15 through connecting means 14. Filter 15 modifies the pitch rate signal by introducing a lag which is proportional to the air frame lag (as will be explained more fully below) and supplies the lagged signal to combining circuit 18 through connecting means 16. Combining circuit 18 combines the signals received through connecting means 16 and 17 and supplies the combined signal to a filter 21 through connecting means 20. Filter 21 further filters the signal received through connecting means 20 and provides an ouput signal at 22 which is representative of aircraft altitude rate of change, which will hereafter be referred to as rate of descent.

It so happens that in solving the differential equations of electrical circuits, it is possible to express the quantities involved in terms of a secondary variable. In terms of this secondary variable, the problem can be solved algebraically. Then by transforming back to the original independent variable, the solution to the original differential equation may be obtained. The transformation which makes these operations possible is called the Laplace transformation. The Laplace transformation transforms a function of time ($t$) into the related function of a complex variable ($s$) according to the equation $$\int_0^\infty f(t)\epsilon^{-st}dt = F(s) \qquad (1)$$

where:

$f(t)$ = a function of time ($t$)
$F(s)$ = the related function of the complex variable ($s$)

Equation 1 may also be written in the form $$L[f(t)] = F(s) \qquad (2)$$

in which operating with L on a function of ($t$) has the meaning of multiplying it by $\epsilon^{-st}$ and integrating with respect to ($t$) from 0 to ∞. Thus, for example $$L[\epsilon^{-at}] = \int_0^\infty \epsilon^{-at}\epsilon^{-st}dt = \frac{1}{a+s} \qquad (3)$$

Equation 2 is called the functional form of the Laplace transformation and may be further simplified and written as $$L[f] = F \qquad (4)$$

which is just a short-hand method of writing Eq. 1.

For facility of expression, the Laplace transformation of all variables and operations will be used in this application.

A possible explanation of the operation of the apparatus comprising the invention will now be given, starting with the obvious identity $$sH = sH\left(\frac{1+Ts}{1+Ts}\right) \qquad (5)$$

Where:

$s$ = the complex variable in the Laplace transformation.
$H = L[h]$, altitude $sH = \dfrac{L[dh]}{dt}$, altitude rate of change, neglecting initial conditions.

$T$ = Time constant to provide adequate filtering.

Now if the numerator is separated into two terms using the common denominator $(1+Ts)$, the equation becomes $$sH = \frac{sH}{(1+Ts)} + \frac{sHTs}{(1+Ts)} \quad (6)$$

It is known that in general $$sH = \frac{V}{57.3} \frac{\oplus}{(1+T_a s)} \quad (7)$$

Where:

$V$ = True air speed
$\oplus = L[\theta]$, Pitch attitude (in degrees)
$T_a$ = Time constant associated wtih response of aircraft to elevator deflections Substitute this value for $sH$ in the second term of Equation 2 producing the equation below:

$$sH = \frac{sH}{1+Ts} + \frac{K_1 T(s\oplus)}{(1+Ts)(1+T_a s)} \quad (8)$$

Where:

$$K_1 = \frac{V}{57.3}$$

Further manipulation of the terms yields the following equation:

$$sH = \frac{1}{1+Ts}\left[\frac{K_1 T(s\oplus)}{1+T_a s} + sH\right] \quad (9)$$

Referring to FIGURE 2, a filter network is shown which comprises an amplifier A having an input resistor R, a feedback resistor $R_f$ and a feedback capacitor C. If an input voltage $E_i$ is applied to the filter, an output voltage $E_0$ is supplied thereby, which can be shown to be related to the input voltage according to the transfer function $$\frac{E_0}{E_i} = -\frac{R_f}{R}\left(\frac{1}{1+R_f C s}\right) \quad (10)$$

Where:

$R_f$ = Feedback resistor
$R$ = Input resistor
$C$ = Feedback capacitor

Filters 15 and 21 may be of the type shown in FIGURE 2. If $R_f$, R, and C are so chosen that $R_f/R = 1$ and $R_f C = T$, Equation 10 becomes $$\frac{E_0}{E_i} = -\frac{1}{1+Ts} \quad (11)$$

Similarly if $R_f$, R, and C are so chosen that $R_f/R = K_1 T$ and $R_f C = T_a$, Equation 10 becomes $$\frac{E_0}{E_i} = -\frac{K_1 T}{1+T_a s} \quad (12)$$

Where:

$T_a = R_f C$ Time constant of the airframe lag.
$T = R_f C$ values found in Equation 10.

Note that Equations 11 and 12 are of the same form as the fractional multipliers in Equation 9. By use of a property of Laplace transformations, the constant multiplier of a time function is unaffected in the transformation process; and conversely, the constant multiplier of a function of $(s)$ is unaffected in the inverse transformation process. These properties are expressed symbolically below:

$$L[af] = aF, \text{ and } L^{-1}[aF] = af$$

Where:

($a$) is a constant and $f$ and $F$ are defined in Equation 4.

If these fractional multipliers are used to operate on the appropriate signals, then Equation 9 is satisfied yielding $sH$, the quantity desired.

One embodiment of this invention incorporated the following values which were determined for a high speed jet-propelled fighter type aircraft:

| Quantity: | | Value |
|---|---|---|
| T | seconds | 2.00 |
| $T_a$ | do | 1.45 |
| $K_1$ | | 4.0 |
| $R_f(15)$ | megohm | 0.8 |
| $R(15)$ | do | 0.1 |
| $C(15)$ | microfarads | 1.45 |
| $R_f(21)$ | megohm | 1.0 |
| $R(21)$ | do | 1.0 |
| $C(21)$ | microfarads | 2.0 |

In operation, assume that an aircraft carrying the apparatus making up the invention is descending at a constant airspeed; a typical value might be 135 knots. Pitch rate gyroscope 13 provides a signal which is a time function of pitch attitude. The pitch rate signal from the pitch rate gyroscope 13 is fed to filter 15 through connecting means 14 and is acted upon by the lag network. The lag $T_a$ produced in the pitch rate gyroscope signal is made proportional to the airframe lag. The lagged pitch rate gyroscope signal is sent to combining circuit 18 through connecting means 16. At the same time, altimeter 10 measures the altitude of the aircraft above a given surface and the altimeter signal which contains high frequency noise is sent to differentiating circuit 12 through connecting means 11. The differentiating circuit then operates on the altimeter signal and noise to produce a differentiated signal which is sent to combining circuit 18 through connecting means 17. Assuming that the aircraft is descending, then a rate of change of altitude or rate of descent will be supplied from the differentiating circuit 12 to the combining circuit 18.

The combining circuit 18 combines the two input signals to produce an output signal which is a combination of the differentiated altimeter signal and the airframe time lagged pitch rate gyroscope signal. This signal is impressed upon filter 21 through connecting means 20 to produce a further lag in the signal combination, the time lag being selected to provide adequate filtering. The output of filter 21 accordingly yields a signal 22 which is the rate of descent and made up of a high frequency component which is produced by the pitch rate gyroscope, and a low frequency component which is produced by altimeter 10.

While I have shown and described a specific embodiment of this invention, the invention should not be limited to the particular form shown, and I intend in the appended claims to cover all modifications which do not depart from the spirit and scope of the invention.

What I claim is:

1. In apparatus measuring rate of motion of a body with respect to a surface, the combination comprising; first means giving a signal representative of the distance from a body to a surface, a lead network energized from said first means, second means giving a signal representative of the rate of movement of said body about an axis substantially aligned with said surface, a first lag network energized from said second means, third means connected only to said lead network and said first lag network for combining the output signals thereof, and a second lag network energized from said third means to provide a signal representative of said body motion rate.

2. In apparatus measuring vertical rate of motion of a vehicle with respect to a surface, the combination comprising; first means giving a signal representative of the vertical distance from a vehicle to a surface, a differentiating network energized from said first means, second means giving a signal representative of the angular rate of movement of said vehicle about an axis substantially aligned with said surface, a first lag network energized from said second means, third means connected only to said lead network for and said first lag network combining the output signals thereof, and a second lag network energized by said third means to provide a signal representative of said vehicle vertical motion rate.

3. In apparatus measuring rate of motion of a vehicle with respect to a surface, the combination comprising; gyroscope means providing a signal which is a time function of said vehicle attitude, means connected to said gyroscope means to produce a phase shift in said signal, means for measuring the perpendicular distance between said vehicle and said surface producing a second signal, second means connected to said means for measuring said perpendicular distance introducing a second phase shift in said second signal, third means combining said first signal and said second signal, and fourth means introducing a third phase shift to said combined first signal and second signal providing a signal representative of said vehicle motion rate.

4. In aircraft altitude rate measuring apparatus the combination comprising; first means producing a signal proportional to altitude, differentiating means connected to said first means to take the time derivative of said altitude signal, second means positioned by air frame pitch attitude and producing a pitch rate signal, filter means connected to said second means producing a lag in said pitch rate signal, combining means attached to said differentiating means and said filter means, said combining means producing an output signal, said output signal being the combination of said differentiated altitude signal and said lagged pitch rate signal, and second filter means joined to said combining means to provide a signal representative of an altitude rate of change.

5. In aircraft altitude rate measuring apparatus, the combination comprising; altimeter means producing an altitude signal, differentiating means connected to said altimeter means to take the time derivative of said altimeter signal, pitch rate measuring means producing a pitch rate signal, lag means connected to said pitch rate measuring means producing a lag in said pitch rate signal, combining means connected to said differentiating means and said lag means, said combining means combining said differentiated altitude signal and said lagged pitch rate signal, and second lag means energized from said combining means to provide a signal representative of a time rate of change of altitude.

6. In vehicle altitude rate measuring apparatus, the combination comprising; a radio altimeter producing a signal proportional to altitude, a lead network connected to said radio altimeter, a pitch rate gyroscope positioned by vehicle pitch attitude and producing a pitch rate signal, a lag network connected to said pitch rate gyroscope producing a lag in said pitch rate signal proportional to vehicle time lag, a combining circuit attached to said lead network and said lag network, and a second lag network joined to said combining circuit, said second lag network producing a second lag in an output signal of said combining circuit supplying adequate filtering and generating a signal representative of a rate of change of altitude of said vehicle.

7. In vehicle rate of descent measuring apparatus, the combination comprising; pressure detecting means producing a signal proportional to said pressure, a differentiating circuit connected to said pressure detecting means to take the time derivative of said pressure signal, a pitch rate gyroscope positioned by vehicle pitch attitude and producing a signal representative of pitch rate, a lag network connected to said pitch rate gyroscope generating a lag in said pitch rate signal proportional to vehicle time lag, a combining circuit attached to said differentiating circuit and said lag network producing an output signal, said output signal being the combination of said differentiated pressure signal and said vehicle time lagged pitch rate signal, and a second lag network joined to said combining circuit producing a second time lag in said output signal of said combining circuit and supplying adequate filtering so that the output of said second lag network provides a signal representative of a rate of descent.

8. In aircraft altitude rate measuring apparatus, the combination comprising; a radar altimeter producing a signal proportional to altitude and high frequency noise, a differentiating circuit connected to said radar altimeter to take the time derivative of said altitude and high frequency noise signal, a pitch rate gyroscope positioned by air frame pitch attitude and producing a pitch rate signal, a first-order lag filter network connected to said pitch rate gyroscope producing a lag in said pitch rate signal proportional to air frame time lag, a combining circuit attached to said differentiating circuit and said first order lag filter network, said combining circuit producing an output signal which is the combination of said differentiated altitude and high frequency noise signal and said air frame time lagged pitch rate signal, and a second first-order lag filter network joined to said combining circuit output creating a second time lag in said output signal of said combining circuit to provide a signal representative of a time rate of change of altitude.

References Cited in the file of this patent

UNITED STATES PATENTS

| | | |
|---|---|---|
| 2,507,304 | Hofstadter | May 9, 1950 |
| 2,644,941 | Kellog | July 7, 1953 |
| 2,686,022 | Hanna | Aug. 10, 1954 |
| 2,710,729 | Meredith | June 14, 1955 |
| 2,769,132 | Jarvis | Oct. 30, 1956 |
| 2,776,428 | Hassler | Jan. 1, 1957 |
| 2,790,946 | Yates | Apr. 30, 1957 |
| 2,934,267 | Wirkler et al. | Apr. 26, 1960 |
| 2,944,768 | Weber | July 12, 1960 |